United States Patent
Suh et al.

(10) Patent No.: US 11,477,640 B2
(45) Date of Patent: Oct. 18, 2022

(54) SECURITY PROTECTION METHOD AND APPARATUS IN WIRELESS COMMUNICATION SYSTEM

(71) Applicant: Samsung Electronics Co., Ltd., Suwon-si (KR)

(72) Inventors: Kyungjoo Suh, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 16/410,334

(22) Filed: May 13, 2019

(65) Prior Publication Data

US 2019/0349764 A1 Nov. 14, 2019

(30) Foreign Application Priority Data

May 11, 2018 (KR) .......................... 10-2018-0054578

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0892* (2013.01); *H04W 12/047* (2021.01); *H04L 9/0861* (2013.01)

(58) Field of Classification Search
CPC . H04W 12/06; H04W 12/041; H04W 12/047; H04L 63/0892; H04L 9/0861
See application file for complete search history.

(56) References Cited

U.S. PATENT DOCUMENTS 3,549,293 A1 10/2013 Hahn et al.
8,638,936 B2 * 1/2014 Suh ..................... H04W 12/041
380/270
(Continued)

FOREIGN PATENT DOCUMENTS

KR 10-2009-0005971 A 1/2009
WO WO-2018056957 A1 * 3/2018 ............ H04W 12/06

OTHER PUBLICATIONS

A. Kunz and X. Zhang, "New 3GPP Security Features in 5G Phase 1," 2018 IEEE Conference on Standards for Communications and Networking (CSCN), 2018, pp. 1-6. (Year: 2018).*

(Continued)

*Primary Examiner* — Kari L Schmidt
(74) *Attorney, Agent, or Firm* — Jefferson IP Law, LLP

(57) ABSTRACT

A method of performing a security mode control procedure by a user equipment (UE), and an apparatus therefor are disclosed. The method includes performing, over a $3^{rd}$ generation partnership project (3GPP) access, a first authentication procedure and a first key agreement procedure with an access and mobility management function (AMF), wherein a key set identifier (ngKSI) is changed during the first authentication procedure and the first key agreement procedure, receiving, from the AMF over the 3GPP access, a first security mode command message including the ngKSI, and receiving, from the AMF over a non-3GPP access, a second security mode command message including the ngKSI, wherein the UE is registered to the AMF and a same public land mobile network (PLMN) over both the 3GPP access and the non-3GPP access.

20 Claims, 8 Drawing Sheets

(51) Int. Cl.
*H04W 12/047* (2021.01)
*H04L 9/08* (2006.01)

(56) References Cited

U.S. PATENT DOCUMENTS

| | | | | |
|---|---|---|---|---|
| 9,560,624 | B2 | 1/2017 | Edge | |
| 10,779,254 | B2* | 9/2020 | Lee | H04L 67/141 |
| 2010/0173610 | A1* | 7/2010 | Kitazoe | H04W 36/0038 455/411 |
| 2010/0180111 | A1 | 7/2010 | Hahn et al. | |
| 2011/0004762 | A1 | 1/2011 | Horn | |
| 2011/0142239 | A1* | 6/2011 | Suh | H04W 12/041 380/270 |
| 2011/0201337 | A1* | 8/2011 | Forsberg | H04L 63/062 455/436 |
| 2014/0059662 | A1* | 2/2014 | Zhu | H04W 12/041 726/6 |
| 2015/0269028 | A1* | 9/2015 | Horn | H04W 12/041 714/4.1 |
| 2016/0127896 | A1* | 5/2016 | Lee | H04W 12/041 455/411 |
| 2017/0078940 | A1* | 3/2017 | Zhang | H04W 76/27 |
| 2018/0007557 | A1* | 1/2018 | Lee | H04W 12/041 |
| 2018/0048465 | A1* | 2/2018 | Schliwa-Bertling | H04L 9/0662 |
| 2018/0103363 | A1* | 4/2018 | Faccin | H04W 12/06 |
| 2018/0331830 | A1* | 11/2018 | Jerichow | H04L 9/14 |
| 2018/0343249 | A1* | 11/2018 | Hahn | H04W 12/06 |
| 2019/0116546 | A1* | 4/2019 | Kang | H04W 48/12 |
| 2019/0253888 | A1* | 8/2019 | Jerichow | H04W 12/04 |
| 2019/0313250 | A1* | 10/2019 | Moisanen | H04W 12/0431 |
| 2019/0335316 | A1* | 10/2019 | Kim | H04W 8/08 |
| 2019/0335330 | A1* | 10/2019 | Salkintzis | H04W 12/06 |
| 2019/0387401 | A1* | 12/2019 | Liao | H04W 12/082 |
| 2020/0162898 | A1* | 5/2020 | Nair | H04W 12/082 |
| 2020/0280849 | A1* | 9/2020 | Ito | H04L 63/18 |
| 2021/0250890 | A1* | 8/2021 | Won | H04W 76/50 |
| 2021/0306849 | A1* | 9/2021 | Liu | H04W 60/00 |

OTHER PUBLICATIONS

X. Zhang, A. Kunz and S. Schröder, "Overview of 5G security in 3GPP," 2017 IEEE Conference on Standards for Communications and Networking (CSCN), 2017, pp. 181-186. (Year: 2017).*

Blanc, Gregory, et al. "Towards a 5G security architecture: Articulating software-defined security and security as a service." Proceedings of the 13th International Conference on Availability, Reliability and Security. 2018, pp. 1-8. (Year: 2018).*

International Search Report dated Aug. 21, 2019, issued in an International application No. PCT/KR2019/005754.

3GPP TS 24.501 V1.1.1; 3rd Generation Partnership Project; Technical Specification Group Core Network and Terminals; Non-Access-Stratum (NAS) protocol for 5G System (5GS); Stage 3, Release 15; May 9, 2018.

Samsung; 3GPP TSG-CT WG1 Meeting #110; C1-182428; Security Mode Command; Apr. 9, 2018 Kunming (P.R. of China).

Intel Corporation; 3GPP TSG-CT WG1 Meeting #110; Security mode control procedure and resetting the NAS Count; C1-182169; Apr. 8, 2018; Kunming (P.R. of China).

Qualcomm Incorporated, "Addding the procedures for handling security context when multiply registered on one PLMN", 3GPP Draft, S3-181322, vol. SA WG3, Belgrade (Serbia), Apr. 16, 2018-Apr. 20, 2018, Apr. 9, 2018, pp. 1-9, XP051438425.

3GPP, "3rd Generation Partnership Project; Technical Specification Group Services and System Aspects; Security architecture and procedures for 5G system (Release 15)", 3GPP TS 33.501 V15.0.0, Mar. 26, 2018, pp. 1-128, XP055644294.

Ericsson, "5GS security, handling of NAS COUNT and NAS sequence number", 3GPP Draft, C1-182022, vol. CT WG1, Kunming (P.R. of China), Apr. 16, 2018-Apr. 20, 2018, Apr. 9, 2018, XP051434470.

Extended European Search Report dated May 3, 2021, issued in European Patent Application No. 19799161.5.

Korean Notice of Allowance dated May 30, 2022, issued in Korean Application No. 10-2018-0054578.

Indian Office Action dated Aug. 10, 2022, issued in Indian Application No. 202037043344.

* cited by examiner

SECURITY PROTECTION METHOD AND APPARATUS IN WIRELESS COMMUNICATION SYSTEM

CROSS-REFERENCE TO RELATED APPLICATION(S)

This application is based on and claims priority under 35 U.S.C. § 119 of a Korean patent application number. 10-2018-0054578, filed on May 11, 2018, in the Korean Intellectual Property Office, the disclosure of which is incorporated by reference herein in its entirety.

BACKGROUND

1. Field

The disclosure relates to a security protection method and apparatus in a wireless communication system.

2. Description of Related Art

To meet the increasing demand for wireless data traffic after commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post-long-term evolution (post-LTE) systems. 5G communication systems defined by the $3^{rd}$ generation partnership project (3GPP) are called New Radio (NR) systems. To achieve high data rates, implementation of 5G communication systems in an ultra-high frequency or millimeter-wave (mm-Wave) band (e.g., a 60-GHz band) is being considered. To reduce path loss and increase a transmission distance in the ultra-high frequency band for 5G communication systems, various technologies such as beamforming, massive multiple-input multiple-output (massive MIMO), full-dimensional MIMO (FD-MIMO), array antennas, analog beamforming, and large-scale antennas are being studied and applied to NR systems. To improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (hybrid FSK and QAM (FQAM)) and sliding-window superposition coding (SWSC), and advanced access technologies such as filter bank multi-carrier (FBMC), non-orthogonal multiple access (NOMA), and sparse code multiple access (SCMA), have been developed.

The internet has evolved from a human-based connection network, where humans create and consume information, to the internet of things (IoT), where distributed elements such as objects exchange information with each other to process the information. Internet of everything (IoE) technology, in which the IoT technology is combined with, for example, technology for processing big data through connection with a cloud server, is emerging. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In the IoT environment, intelligent internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are being implemented by using 5G communication technology including beamforming, MIMO, array antennas, etc. The application of Cloud-RAN as the above-described big data processing technology may be an example of the convergence of 5G communication technology and IoT technology.

Because various services may be provided due to the development of mobile communication systems, methods capable of effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively providing services in a mobile communication system.

Additional aspects will be set forth in part in the description which follows and, in part, will be apparent from the description, or may be learned by practice of the presented embodiments of the disclosure.

In accordance with an aspect of the disclosure, a method of performing a security mode control procedure by a user equipment (UE) is provided. The method includes performing, over a $3^{rd}$ generation partnership project (3GPP) access, a first authentication procedure and a first key agreement procedure with an access and mobility management function (AMF), wherein a key set identifier (ngKSI) is changed during the first authentication procedure and the first key agreement procedure, receiving, from the AMF over the 3GPP access, a first security mode command message including the ngKSI, and receiving, from the AMF over a non-3GPP access, a second security mode command message including the ngKSI, wherein the UE is registered to the AMF and a same public land mobile network (PLMN) over both the 3GPP access and the non-3GPP access.

The ngKSI may correspond to security context changed based on the first authentication procedure and the first key agreement procedure.

The method may further include transmitting, to the AMF, a first security mode complete message in response to the first security mode command message, and transmitting, to the AMF, a second security mode complete message in response to the second security mode command message.

The method may further include performing, over a non-3GPP access, a second authentication procedure and a second key agreement procedure with the AMF, wherein a ngKSI is changed during the second authentication procedure and the second key agreement procedure, receiving, from the AMF over the non-3GPP access, a third security mode command message including the ngKSI changed during the second authentication procedure and the second key agreement procedure, and receiving, from the AMF over a 3GPP access, a fourth security mode command message including the ngKSI changed during the second authentication procedure and the second key agreement procedure.

The ngKSI changed during the second authentication procedure and the second key agreement procedure may correspond to security context changed based on the second authentication procedure and the second key agreement procedure.

According to another embodiment of the disclosure, a user equipment (UE) includes a transceiver, and at least one controller (e.g., at least one processor) connected to the transceiver and configured to perform, over a $3^{rd}$ generation partnership project (3GPP) access, a first authentication procedure and a first key agreement procedure with an access and mobility management function (AMF), wherein a key set identifier (ngKSI) is changed during the first authentication procedure and the first key agreement procedure, receive, from the AMF over the 3GPP access, a first security mode command message including the ngKSI, and receive, from the AMF over a non-3GPP access, a second security mode command message including the ngKSI, wherein the UE is registered to the AMF and a same public land mobile network (PLMN) over both the 3GPP access and the non-3GPP access.

The ngKSI may correspond to security context changed based on the first authentication procedure and the first key agreement procedure.

The at least one controller may be further configured to transmit, to the AMF, a first security mode complete message in response to the first security mode command message, and transmit, to the AMF, a second security mode complete message in response to the second security mode command message.

The at least one controller may be further configured to perform, over a non-3GPP access, a second authentication procedure and a second key agreement procedure with the AMF, wherein a ngKSI is changed during the second authentication procedure and the second key agreement procedure, receive, from the AMF over the non-3GPP access, a third security mode command message including the ngKSI changed during the second authentication procedure and the second key agreement procedure, and receive, from the AMF over a 3GPP access, a fourth security mode command message including the ngKSI changed during the second authentication procedure and the second key agreement procedure.

The ngKSI changed during the second authentication procedure and the second key agreement procedure may correspond to security context changed based on the second authentication procedure and the second key agreement procedure.

In accordance with another aspect of the disclosure, a method of performing a security mode control procedure by an access and mobility management function (AMF) includes performing, over a $3^{rd}$ generation partnership project (3GPP) access, a first authentication procedure and a first key agreement procedure with a user equipment (UE), wherein a key set identifier (ngKSI) is changed during the first authentication procedure and the first key agreement procedure, transmitting, to the UE over the 3GPP access, a first security mode command message including the ngKSI, and transmitting, to the UE over a non-3GPP access, a second security mode command message including the ngKSI, wherein the UE is registered to the AMF and a same public land mobile network (PLMN) over both the 3GPP access and the non-3GPP access.

The ngKSI may correspond to security context changed based on the first authentication procedure and the first key agreement procedure.

The method may further include receiving, from the UE, a first security mode complete message in response to the first security mode command message, and receiving, from the UE, a second security mode complete message in response to the second security mode command message.

The method may further include performing, over a non-3GPP access, a second authentication procedure and a second key agreement procedure with the UE, wherein a ngKSI is changed during the second authentication procedure and the second key agreement procedure, transmitting, to the UE over the non-3GPP access, a third security mode command message including the ngKSI changed during the second authentication procedure and the second key agreement procedure, and transmitting, to the UE over a 3GPP access, a fourth security mode command message including the ngKSI changed during the second authentication procedure and the second key agreement procedure.

The ngKSI changed during the second authentication procedure and the second key agreement procedure may correspond to security context changed based on the second authentication procedure and the second key agreement procedure.

In accordance with another embodiment of the disclosure, an access and mobility management function (AMF) includes a transceiver, and at least one controller connected to the transceiver and configured to perform, over a $3^{rd}$ generation partnership project (3GPP) access, a first authentication procedure and a first key agreement procedure with a user equipment (UE), wherein a key set identifier (ngKSI) is changed during the first authentication procedure and the first key agreement procedure, transmit, to the UE over the 3GPP access, a first security mode command message including the ngKSI, and transmit, to the UE over a non-3GPP access, a second security mode command message including the ngKSI, wherein the UE is registered to the AMF and a same public land mobile network (PLMN) over both the 3GPP access and the non-3GPP access.

The ngKSI may correspond to security context changed based on the first authentication procedure and the first key agreement procedure.

The at least one controller may be further configured to receive, from the UE, a first security mode complete message in response to the first security mode command message, and receive, from the UE, a second security mode complete message in response to the second security mode command message.

The at least one controller may be further configured to perform, over a non-3GPP access, a second authentication procedure and a second key agreement procedure with the UE, wherein a ngKSI is changed during the second authentication procedure and the second key agreement procedure, transmit, to the UE over the non-3GPP access, a third security mode command message including the ngKSI changed during the second authentication procedure and the second key agreement procedure, and transmit, to the UE over a 3GPP access, a fourth security mode command message including the ngKSI changed during the second authentication procedure and the second key agreement procedure.

The ngKSI changed during the second authentication procedure and the second key agreement procedure may correspond to security context changed based on the second authentication procedure and the second key agreement procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
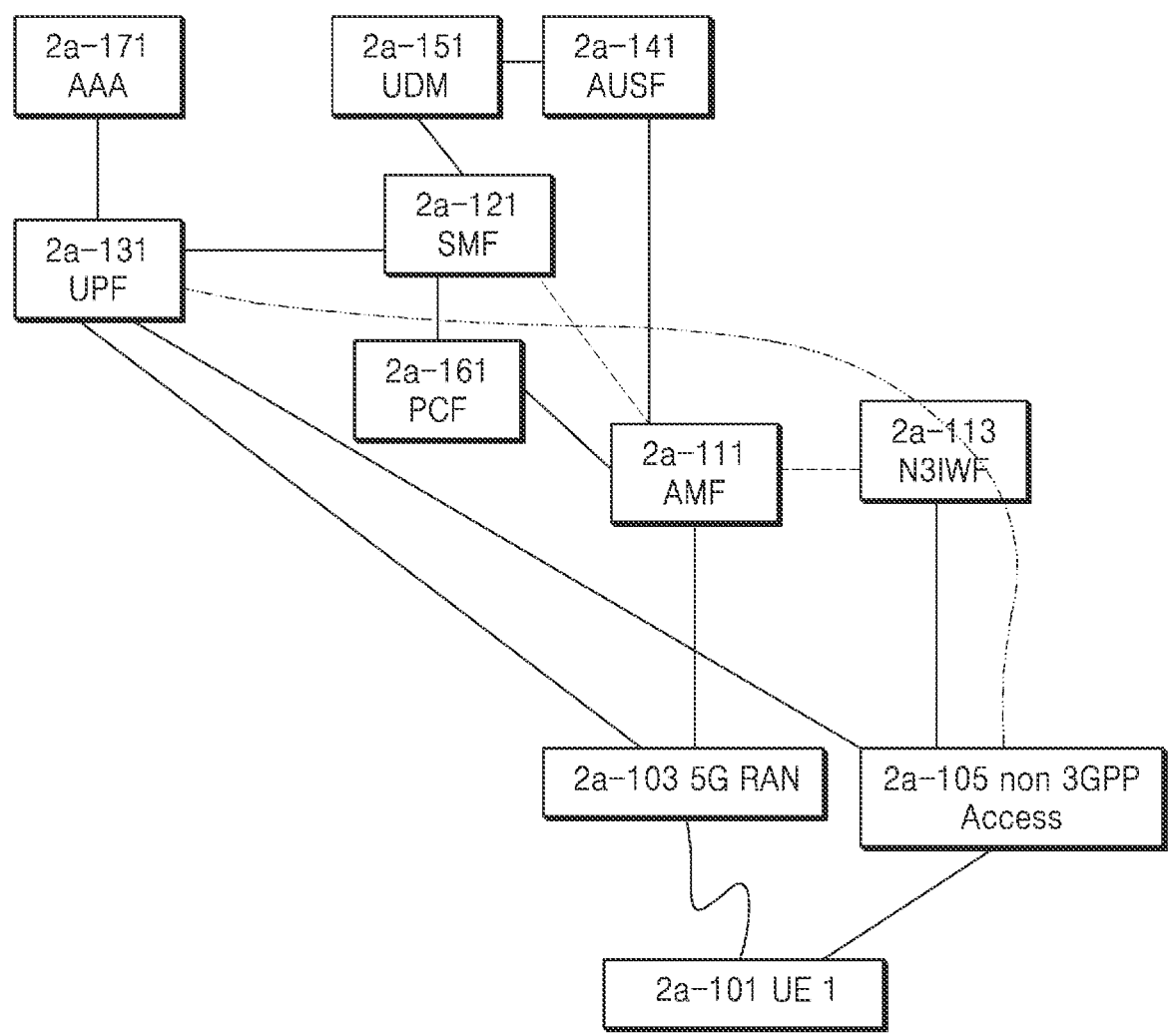
FIG. 1 is a diagram illustrating a network environment to which a security protection method and apparatus, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing embodiments of the disclosure, technical content that is well-known in the art and not directly related to the disclosure will not be provided. By omitting redundant descriptions, the essence of the disclosure will not be obscured and may be clearly explained.

For the same reasons, elements may be exaggerated, omitted, or schematically illustrated in the drawings for clarity. Also, the size of each element does not completely reflect a real size thereof. In the drawings, like reference numerals denote like elements.

One or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the embodiments of the disclosure to one of ordinary skill in the art, and the disclosure will only be defined by the appended claims.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, the "unit" may include at least one processor.

Throughout the disclosure, the expression "at least one of a, b or c" indicates only a, only b, only c, both a and b, both a and c, both b and c, all of a, b, and c, or variations thereof.

In the following description, terms identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used.

To facilitate explanation, the disclosure uses terms and names defined in the $5^{th}$ generation (5G) or New Radio (NR), and long-term evolution (LTE) communication standards. However, the disclosure is not limited to these terms and names and may be equally applied to systems conforming to other standards.

That is, although embodiments of the disclosure will be described mainly based on the communication standards of the $3^{rd}$ generation partnership project (3GPP), it will be understood by one of ordinary skill in the art that the main concept of the disclosure may be slightly modified and applied to other communication systems having similar technical backgrounds without departing from the scope of the disclosure.

In a 5G or NR system, an access and mobility management function (AMF) serving as an entity for managing user equipment (UE) mobility is separate from a session management function (SMF) serving as an entity for managing sessions. As such, unlike a $4^{th}$ generation (4G) LTE system in which a mobility management entity (MME) manages both mobility and sessions, a mobility management entity is separate from a session management entity and thus a communication scheme and a communication management scheme between a UE and a network entity are changed.

In the 5G or NR system, for a non-3GPP access, mobility management is performed though a N3 interworking function (N3IWF) and the AMF and session management is performed through the SMF.

Therefore, a method of protecting information used for communication between a UE and a network not only via a 3GPP access but also via a non-3GPP access when an AMF is separate from a SMF, and of creating, storing, updating, and managing security-related context is required.

As such, the disclosure proposes a method and apparatus related to creation, storage, updating, and management of security context used for security protection of a UE and a network entity in a mobile communication system.

FIG. 1 is a diagram illustrating a network environment to which a security protection method and apparatus, according to an embodiment of the disclosure.

Referring to FIG. 1, a wireless communication system is assumed as a 5G or NR system. Referring to FIG. 1, the wireless communication system may include entities such as a user plane function (UPF) 2a-131, a session management function (SMF) 2a-121, an access and mobility management function (AMF) 2a-111, a 5G radio access network (RAN) 2a-103, a user data management (UDM) 2a-151, and a policy control function (PCF) 2a-161. To authenticate the above-mentioned entities, the wireless communication system may include entities such as an authentication server function (AUSF) 2a-141 and an authentication, authorization and accounting (AAA) 2a-171.

For communication of a user equipment (UE) 2a-101 via a non-3GPP access 2a-105, the wireless communication system may include a N3 interworking function (N3IWF) 2a-113. When the UE 2a-101 communicates via the non-3GPP access 2a-105, session management is controlled by the UE 2a-101, the non-3GPP access 2a-105, the N3IWF 2a-113, and the SMF 2a-121, and mobility management is controlled by the UE 2a-101, the non-3GPP access 2a-105, the N3IWF 2a-113, and the AMF 2a-111.

Although the wireless communication system is assumed as a 5G or NR system in FIG. 1, embodiments of the disclosure are not limited thereto and are also applicable to other systems as far as one of ordinary skill in the art may understand.

Figure 2:
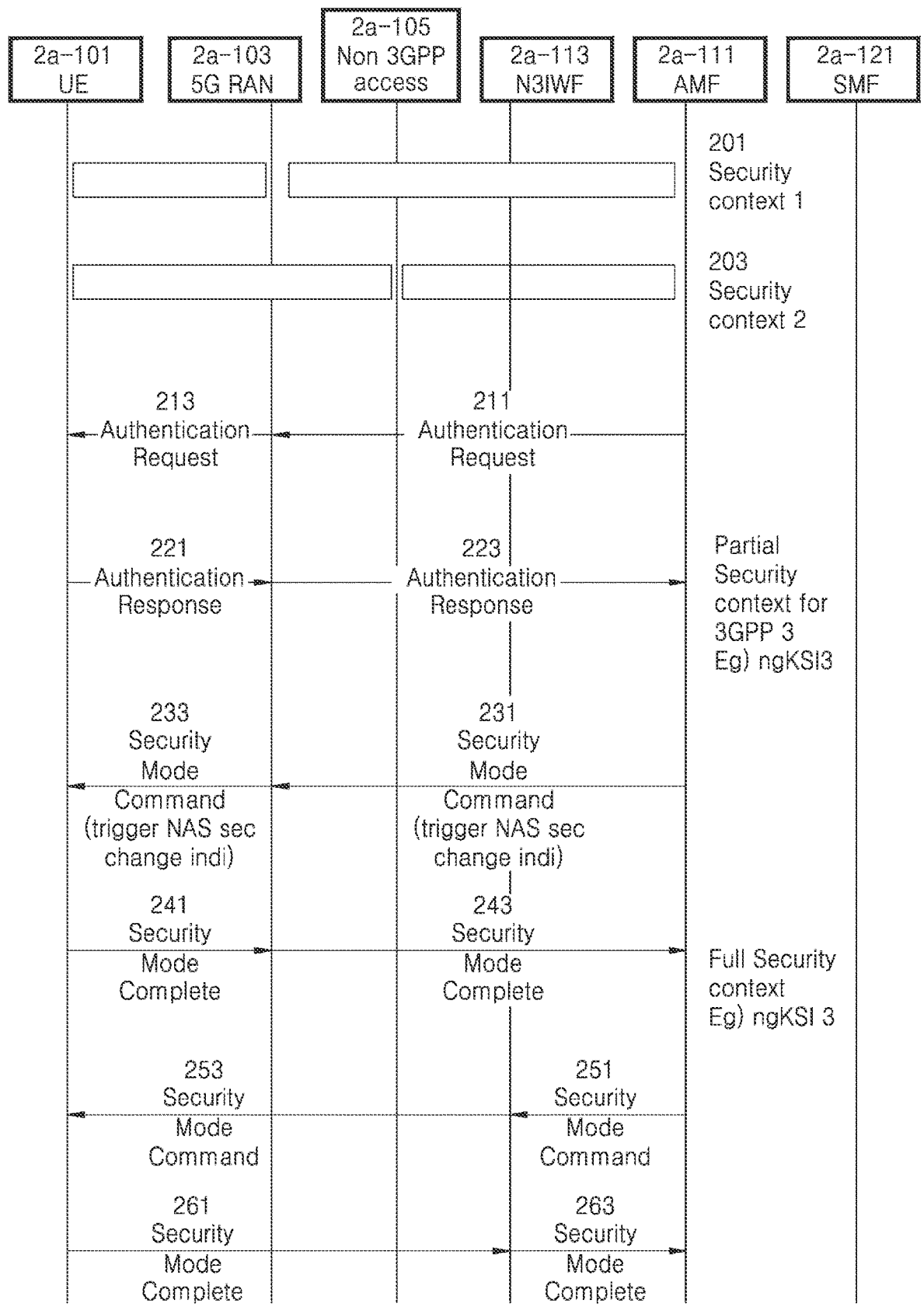
FIG. 2 is a flowchart of a security protection method according to an embodiment of the disclosure.

FIG. 2 is a flowchart of a security protection method according to an embodiment of the disclosure.

Referring to FIG. 2, initially, in operations 201 and 203, each of the UE 2a-101 and the AMF 2a-111 has security context 1 via a 3GPP access and security context 2 via a non-3GPP access. That is, the UE 2a-101 may be connected to the AMF 2a-111 via the 3GPP access and, simultaneously, be connected to the AMF 2a-111 via the non-3GPP access through a registration procedure.

In an embodiment of the disclosure, connection may be enabled via a 3GPP next-generation (NG) RAN, i.e., the 3GPP access, and the non-3GPP access, and the UE 2a-101 may be connected to the same AMF 2a-111 and registered to the same public land mobile network (PLMN) over the two accesses. Although connected to the same AMF 2a-111 via the 3GPP access and the non-3GPP access, when different PLMNs are used, security contexts may be managed separately. That is, the security context via the 3GPP access and the security context via the non-3GPP access may be managed separately.

In operations 211 and 213, the AMF 2a-111 transmits an authentication request to the UE 2a-101. In operations 221 and 223, the UE 2a-101 transmits an authentication response to the AMF 2a-111.

Through operations 211 to 223, a master key value related to security is changed through 5G authentication and key agreement (AKA) or extensible authentication protocol-authentication and key agreement (EAP-AKA'). That is, a security anchor function key (Kseaf) is changed. Consequently, an access and mobility management function key (Kamf) is changed.

That is, through operations 211 to 223, the UE 2a-101 and the AMF 2a-111 have a partial security context, i.e., a 5G key set identifier (ngKSI) and Kamf associated therewith. In an embodiment of the disclosure, when AKA is performed via the 3GPP access, Kseaf is changed, Kamf is changed, and ngKSI associated therewith is also changed. For example, the ngKSI may be changed from ngKSI 1 to ngKSI 3.

After the AKA procedure is performed, a full security context may be created through a security mode command (SMC) procedure.

In operations 231 and 233, the AMF 2a-111 transmits a security mode command to the UE 2a-101. In an embodiment of the disclosure, operations 231 and 233 are performed to give an indication of triggering SMC not only for the 3GPP access, via which AKA is performed and thus SMC is correspondingly performed, but also for the non-3GPP access other than the 3GPP access. That is, "when the master key is changed through the authentication operation between the UE 2a-101 and the AMF 2a-111 and the change in the master key corresponding to a result of the AKA is desired to be applied to connection via the non-3GPP access", the AMF 2a-111 sends an indication thereof to the UE 2a-101. Although the 3GPP access is initially changed and then the non-3GPP access is changed in FIG. 2, embodiments of the disclosure are not limited thereto and the non-3GPP access may be initially changed and then the 3GPP access may be changed.

Then, in operations 241 and 243, the UE 2a-101 sends a security mode complete message to the AMF 2a-111. After operations 241 and 243 are performed, the UE 2a-101 and the AMF 2a-111 have the full security context.

In operations 251 and 253, the AMF 2a-111 sends a security mode command to the UE 2a-101 via the non-3GPP access other than the 3GPP access via which the authentication operation is newly performed, that is, the reauthentication operation is performed.

In an embodiment of the disclosure, because the same AMF and the same PLMN are used and the AKA is performed via another access, i.e., the 3GPP access, to change the master key, i.e., Kseaf, Kamf may be changed. For example, when the same ngKSI is used, the above-described operation may be performed. The same ngKSI indicates the same security key related to the ngKSI. In this case, Kseaf or Kamf obtained through the AKA procedure via the 3GPP access may be used.

As described above, when the master key or the like is changed through the authentication procedure via the 3GPP access, the change in the master key may also be applied to the non-3GPP access. In an embodiment of the disclosure, ngKSI related to the security key, i.e., Kamf or Kseaf, obtained through the above-described authentication procedure via the 3GPP access is sent. For example, ngKSI 3 may be set as the ngKSI and be transmitted from the AMF 2a-111 to the UE 2a-101.

Then, in operations 261 and 263, the UE 2a-101 sends a security mode complete message to the AMF 2a-111.

Figure 3:
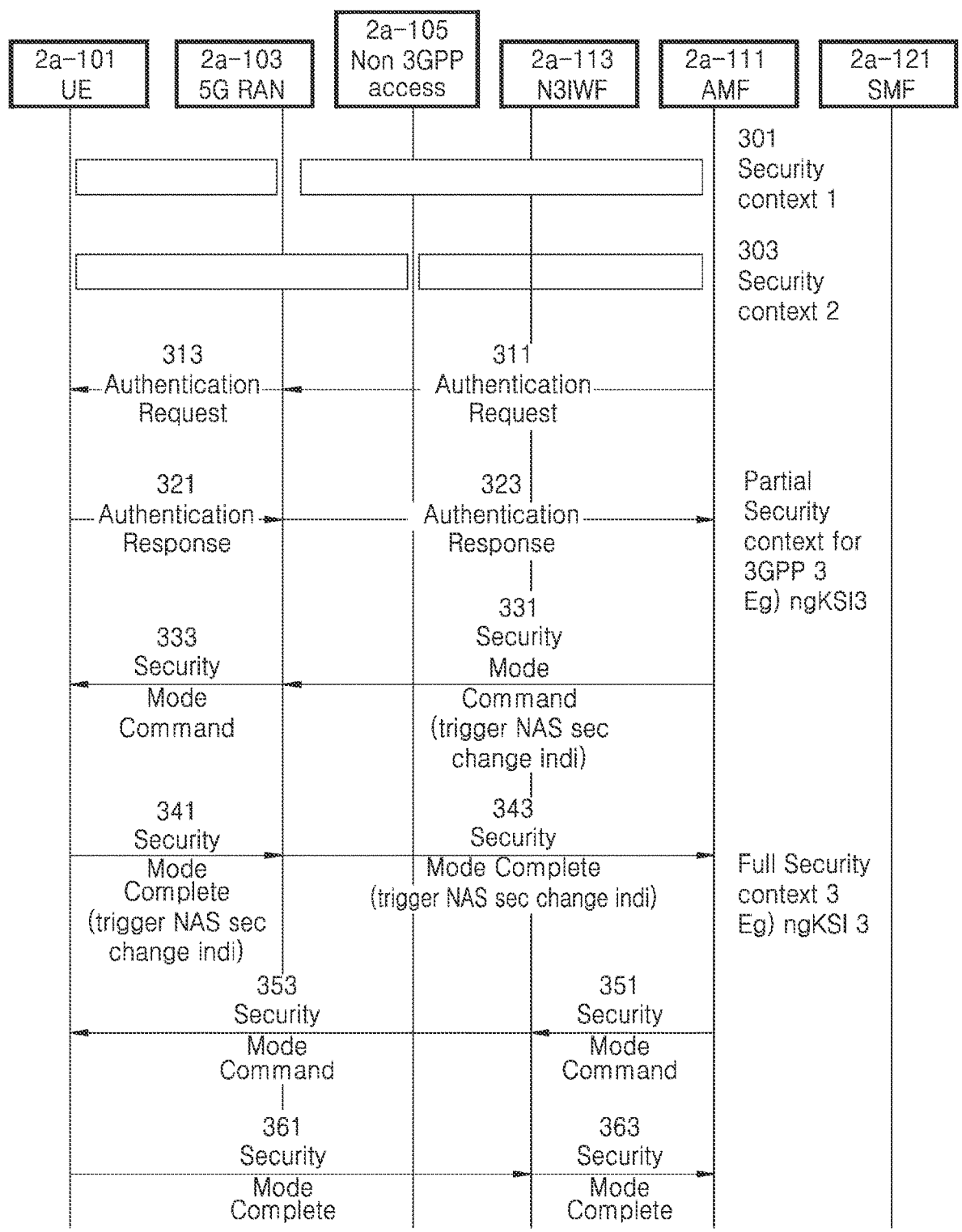
FIG. 3 is a flowchart of a security protection method according to another embodiment of the disclosure.

FIG. 3 is a flowchart of a security protection method according to another embodiment of the disclosure.

Referring to FIG. 3, initially, in operations 301 and 303, each of the UE 2a-101 and the AMF 2a-111 has security context 1 via a 3GPP access and security context 2 via a non-3GPP access. That is, the UE 2a-101 may be connected to the AMF 2a-111 via the 3GPP access and, simultaneously, be connected to the AMF 2a-111 via the non-3GPP access through a registration procedure.

In an embodiment of the disclosure, connection may be enabled via a 3GPP NG RAN, i.e., the 3GPP access, and the non-3GPP access, and the UE 2a-101 may be connected to the same AMF 2a-111 and registered to the same PLMN over the two accesses.

Although connected to the same AMF 2a-111 via the 3GPP access and the non-3GPP access, when different PLMNs are used, security contexts may be managed separately. That is, the security context via the 3GPP access and the security context via the non-3GPP access may be managed separately.

In operations 311 and 313, the AMF 2a-111 transmits an authentication request to the UE 2a-101. In operations 321 and 323, the UE 2a-101 transmits an authentication response to the AMF 2a-111.

Through operations 311 to 323, a master key value related to security is changed through 5G AKA or EAP-AKA'. That is, Kseaf is changed. Consequently, Kamf is changed.

That is, through operations 311 to 323, the UE 2a-101 and the AMF 2a-111 have a partial security context, i.e., ngKSI and Kamf associated therewith. In an embodiment of the disclosure, when AKA is performed via the 3GPP access, Kseaf is changed, Kamf is changed, and ngKSI associated therewith is also changed. For example, the ngKSI may be changed from ngKSI 1 to ngKSI 3.

After the AKA procedure is performed, a full security context may be created through a SMC procedure.

In operations 331 and 333, the AMF 2a-111 transmits a security mode command to the UE 2a-101. In operations 341 and 343, the UE 2a-101 sends a security mode complete message to the AMF 2a-111.

In an embodiment of the disclosure, operations 341 and 343 are performed to give an indication of triggering SMC not only for the 3GPP access, via which AKA is performed and thus SMC is correspondingly performed, but also for the non-3GPP access. That is, "when the master key is changed through the authentication operation between the UE 2a-101 and the AMF 2a-111 and the change in the master key corresponding to a result of the AKA is desired to be applied to connection via the non-3GPP access", the UE 2a-101 sends an indication thereof to the AMF 2a-111.

Then, after operations 341 and 343 are performed, the UE 2a-101 and the AMF 2a-111 have the full security context.

Subsequently, in operations 351 and 353, the AMF 2a-111 sends a security mode command to the UE 2a-101 via the non-3GPP access other than the 3GPP access via which the authentication operation is newly performed, that is, the re-authentication operation is performed.

In an embodiment of the disclosure, because the same AMF and the same PLMN are used and the AKA is performed via another access, i.e., the 3GPP access, to change the master key, i.e., Kseaf, Kamf may be changed. For example, when the same ngKSI is used, the above-described operation may be performed.

The same ngKSI indicates the same security key related to the ngKSI. In this case, Kseaf or Kamf obtained through the AKA procedure via the 3GPP access may be used.

As described above, when the master key or the like is changed through the authentication procedure via the 3GPP access, the change in the master key may also be applied to the non-3GPP access.

In an embodiment of the disclosure, ngKSI related to the security key, i.e., Kamf or Kseaf, obtained through the above-described authentication procedure via the 3GPP access is sent.

For example, ngKSI 3 may be set as the ngKSI and be transmitted from the AMF 2a-111 to the UE 2a-101.

Then, in operations 361 and 363, the UE 2a-101 sends a security mode complete message to the AMF 2a-111.

Figure 4:
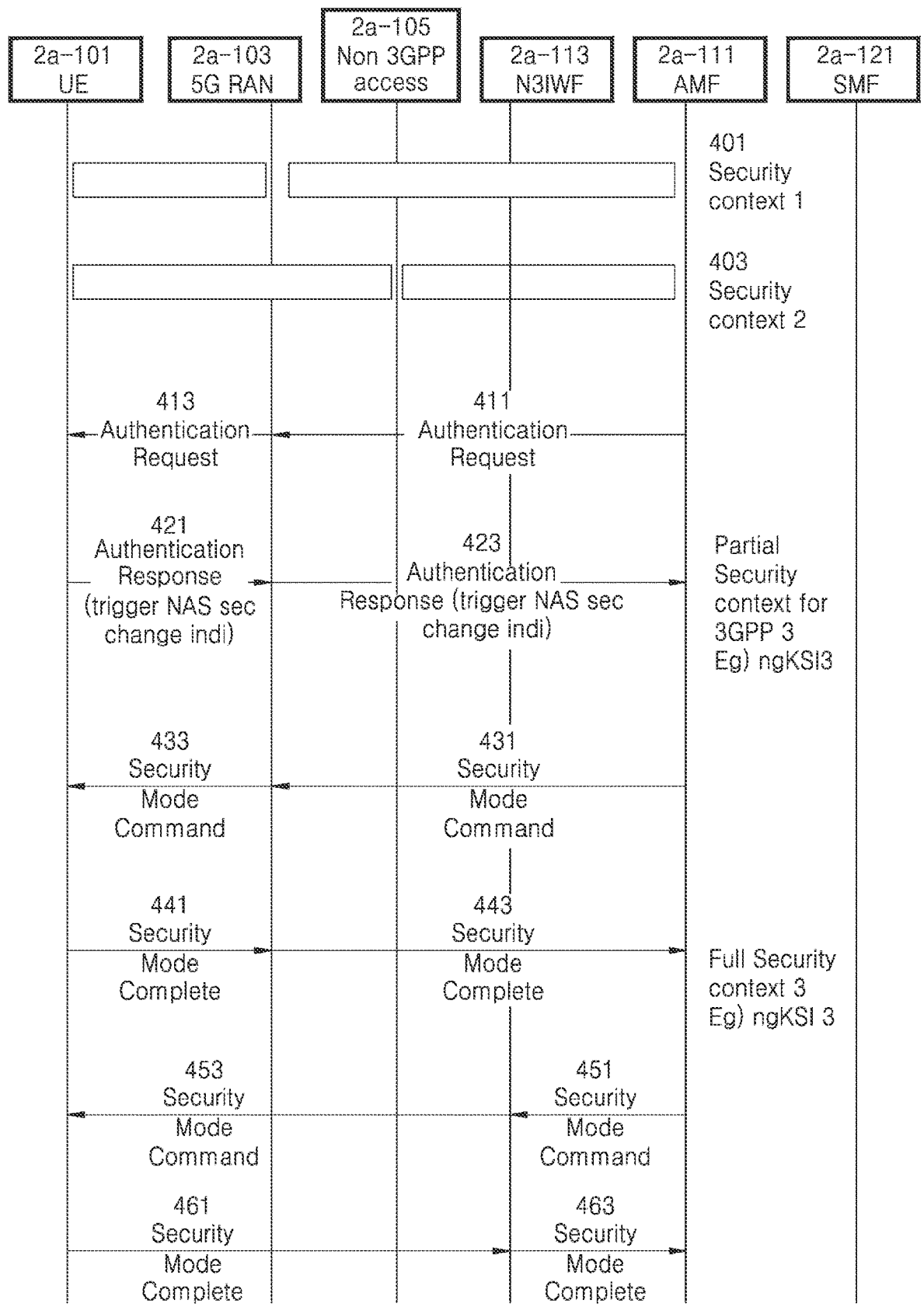
FIG. 4 is a flowchart of a security protection method according to another embodiment of the disclosure.

FIG. 4 is a flowchart of a security protection method according to another embodiment of the disclosure.

Referring to FIG. 4, in operations 401 and 403, each of the UE 2a-101 and the AMF 2a-111 has security context 1 via a 3GPP access and security context 2 via a non-3GPP access. That is, the UE 2a-101 may be connected to the AMF 2a-111 via the 3GPP access and, simultaneously, be connected to the AMF 2a-111 via the non-3GPP access through a registration procedure.

In an embodiment of the disclosure, connection may be enabled via a 3GPP NG RAN, i.e., the 3GPP access, and the non-3GPP access, and the UE 2a-101 may be connected to the same AMF 2a-111 and registered to the same PLMN over the two accesses. Although connected to the same AMF 2a-111 via the 3GPP access and the non-3GPP access, when different PLMNs are used, security contexts may be managed separately. That is, the security context via the 3GPP access and the security context via the non-3GPP access may be managed separately.

In operations 411 and 413, the AMF 2a-111 transmits an authentication request to the UE 2a-101. In operations 421 and 423, the UE 2a-101 transmits an authentication response to the AMF 2a-111.

Through operations 411 to 423, a master key value related to security is changed through 5G AKA or EAP-AKA'. That is, Kseaf is changed. Consequently, Kamf is changed.

That is, through operations 411 to 423, the UE 2a-101 and the AMF 2a-111 have a partial security context, i.e., ngKSI and Kamf associated therewith. In an embodiment of the disclosure, when AKA is performed via the 3GPP access, Kseaf is changed, Kamf is changed, and ngKSI associated therewith is also changed. For example, the ngKSI may be changed from ngKSI 1 to ngKSI 3.

Operations 421 and 423 are performed to give an indication of triggering SMC not only for the 3GPP access, via which AKA is performed and thus SMC is correspondingly performed, but also for the non-3GPP access. When the master key is changed through the authentication operation between the UE 2a-101 and the AMF 2a-111 and the change in the master key corresponding to a result of the AKA is desired to be applied to connection via the non-3GPP access, the UE 2a-101 sends an indication thereof to the AMF 2a-111.

After the AKA procedure is performed, a full security context may be created through a SMC procedure. In operations 431 and 433, the AMF 2a-111 transmits a security mode command to the UE 2a-101.

Then, in operations 441 and 443, the UE 2a-101 sends a security mode complete message to the AMF 2a-111.

After operations 441 and 443 are performed, the UE 2a-101 and the AMF 2a-111 have the full security context.

Subsequently, in operations 451 and 453, the AMF 2a-111 sends a security mode command to the UE 2a-101 via the non-3GPP access other than the 3GPP access via which the authentication operation is newly performed, that is, the reauthentication operation is performed.

In an embodiment of the disclosure, because the same AMF and the same PLMN are used and the AKA is performed via another access (i.e., the 3GPP access) to change the master key, i.e., Kseaf, Kamf may be changed. For example, when the same ngKSI is used, the above-described operation may be performed.

The same ngKSI indicates the same security key related to the ngKSI. In this case, Kseaf or Kamf obtained through the AKA procedure via the 3GPP access may be used.

As described above, when the master key or the like is changed through the authentication procedure via the 3GPP access, the change in the master key may also be applied to the non-3GPP access.

In an embodiment of the disclosure, ngKSI related to the security key, i.e., Kamf or Kseaf, obtained through the above-described authentication procedure via the 3GPP access is sent.

For example, ngKSI 3 may be set as the ngKSI and be transmitted from the AMF 2a-111 to the UE 2a-101.

Then, in operations 461 and 463, the UE 2a-101 sends a security mode complete message to the AMF 2a-111.

Figure 5:
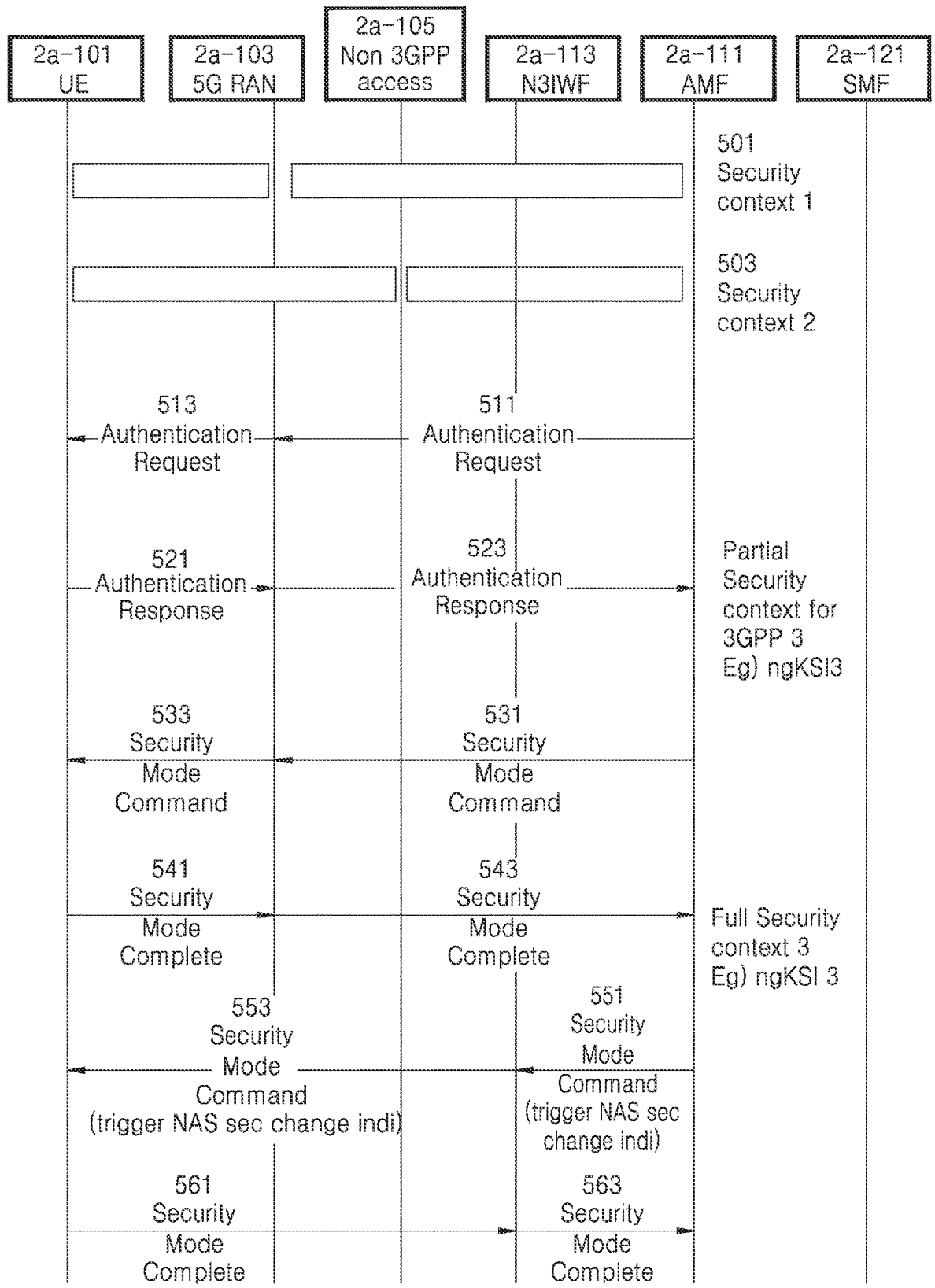
FIG. 5 is a flowchart of a security protection method according to another embodiment of the disclosure.

FIG. 5 is a flowchart of a security protection method according to another embodiment of the disclosure.

Referring to FIG. 5, initially, in operations 501 and 503, each of the UE 2a-101 and the AMF 2a-111 has security context 1 via a 3GPP access and security context 2 via a non-3GPP access. That is, the UE 2a-101 may be connected to the AMF 2a-111 via the 3GPP access and, simultaneously, be connected to the AMF 2a-111 via the non-3GPP access through a registration procedure.

In an embodiment of the disclosure, connection may be enabled via a 3GPP NG RAN, i.e., the 3GPP access, and the non-3GPP access, and the UE 2a-101 may be connected to the same AMF 2a-111 and registered to the same PLMN over the two accesses. Although connected to the same AMF 2a-111 via the 3GPP access and the non-3GPP access, when different PLMNs are used, security contexts may be managed separately. That is, the security context via the 3GPP access and the security context via the non-3GPP access may be managed separately.

In operations 511 and 513, the AMF 2a-111 transmits an authentication request to the UE 2a-101. In operations 521 and 523, the UE 2a-101 transmits an authentication response to the AMF 2a-111.

Through operations 511 to 523, a master key value related to security is changed through 5G AKA or EAP-AKA'. That is, Kseaf is changed. Consequently, Kamf is changed.

That is, through operations 511 to 523, the UE 2a-101 and the AMF 2a-111 have a partial security context, i.e., ngKSI and Kamf associated therewith. In an embodiment of the disclosure, when AKA is performed via the 3GPP access, Kseaf is changed, Kamf is changed, and ngKSI associated therewith is also changed. For example, the ngKSI may be changed from ngKSI 1 to ngKSI 3.

After the AKA procedure is performed, a full security context may be created through a SMC procedure.

In operations 531 and 533, the AMF 2a-111 transmits a security mode command to the UE 2a-101.

Then, in operations 541 and 543, the UE 2a-101 sends a security mode complete message to the AMF 2a-111. After operations 541 and 543 are performed, the UE 2a-101 and the AMF 2a-111 have the full security context.

In operations 551 and 553, the AMF 2a-111 sends a security mode command to the UE 2a-101 via the non-3GPP access other than the 3GPP access via which the authentication operation is newly performed, that is, the re-authentication operation is performed.

Operations 531 and 533 are performed to give an indication of triggering SMC not only for the 3GPP access, via which AKA is performed and thus SMC is correspondingly performed, but also for the non-3GPP access. When the master key is changed through the authentication operation between the UE 2a-101 and the AMF 2a-111 and the change in the master key corresponding to a result of the AKA is desired to be applied to connection via the non-3GPP access, the UE 2a-101 sends an indication thereof to the AMF 2a-111.

In an embodiment of the disclosure, an explicit indication may not be transmitted.

In an embodiment of the disclosure, because the same AMF and the same PLMN are used and the AKA is performed via another access (i.e., the 3GPP access) to change the master key, i.e., Kseaf, Kamf may be changed. For example, when the same ngKSI is used, the above-described operation may be performed.

The same ngKSI indicates the same security key related to the ngKSI. In this case, Kseaf or Kamf obtained through the AKA procedure via the 3GPP access may be used.

As described above, when the master key or the like is changed through the authentication procedure via the 3GPP access, the change in the master key may also be applied to the non-3GPP access.

In an embodiment of the disclosure, ngKSI related to the security key, i.e., Kamf or Kseaf, obtained through the above-described authentication procedure via the 3GPP access is sent.

For example, ngKSI 3 may be set as the ngKSI and be transmitted from the AMF 2a-111 to the UE 2a-101.

Then, in operations 561 and 563, the UE 2a-101 sends a security mode complete message to the AMF 2a-111.

Figure 6:
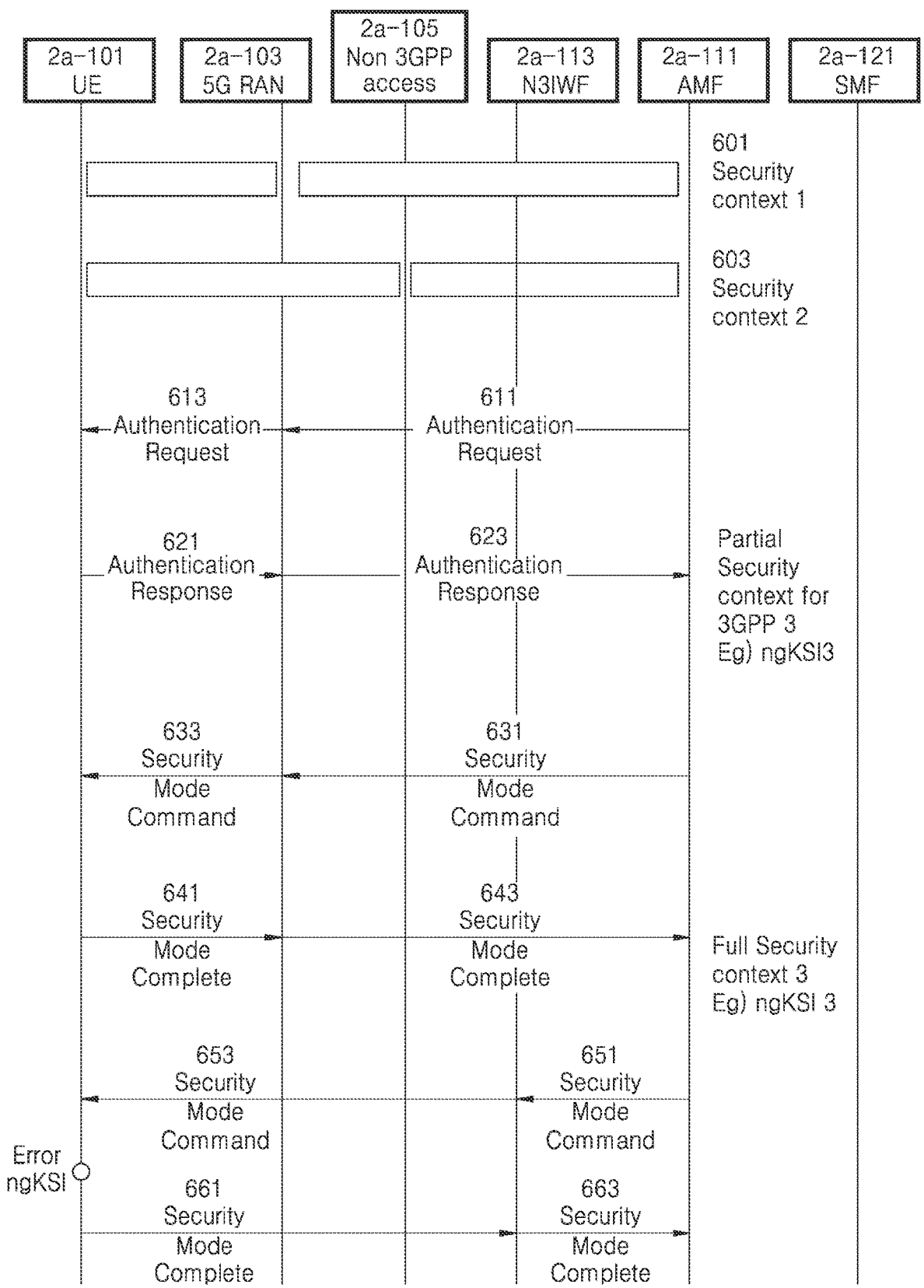
FIG. 6 is a flowchart of a security protection method according to another embodiment of the disclosure.

FIG. 6 is a flowchart of a security protection method according to another embodiment of the disclosure.

Referring to FIG. 6, initially, in operations 601 and 603, each of the UE 2a-101 and the AMF 2a-111 has security context 1 via a 3GPP access and security context 2 via a non-3GPP access. That is, the UE 2a-101 may be connected to the AMF 2a-111 via the 3GPP access and, simultaneously, be connected to the AMF 2a-111 via the non-3GPP access through a registration procedure.

In an embodiment of the disclosure, connection may be enabled via a 3GPP NG RAN, i.e., the 3GPP access, and the non-3GPP access, and the UE 2a-101 may be connected to the same AMF 2a-111 and registered to the same PLMN over the two accesses. Although connected to the same AMF 2a-111 via the 3GPP access and the non-3GPP access, when different PLMNs are used, security contexts may be managed separately. That is, the security context via the 3GPP access and the security context via the non-3GPP access may be managed separately.

In operations 611 and 613, the AMF 2a-111 transmits an authentication request to the UE 2a-101. In operations 621 and 623, the UE 2a-101 transmits an authentication response to the AMF 2a-111.

Through operations 611 to 623, a master key value related to security is changed through 6G AKA or EAP-AKA'. That is, Kseaf is changed. Consequently, Kamf is changed.

That is, through operations 611 to 623, the UE 2a-101 and the AMF 2a-111 have a partial security context, i.e., ngKSI and Kamf associated therewith. In an embodiment of the disclosure, when AKA is performed via the 3GPP access, Kseaf is changed, Kamf is changed, and ngKSI associated therewith is also changed. For example, the ngKSI may be changed from ngKSI 1 to ngKSI 3.

After the AKA procedure is performed, a full security context may be created through a SMC procedure.

In operations 631 and 633, the AMF 2a-111 transmits a security mode command to the UE 2a-101.

Then, in operations 641 and 643, the UE 2a-101 sends a security mode complete message to the AMF 2a-111. After operations 641 and 643 are performed, the UE 2a-101 and the AMF 2a-111 have the full security context.

In operations 651 and 653, the AMF 2a-111 sends a security mode command to the UE 2a-101 via the non-3GPP access other than the 3GPP access via which the authentication operation is newly performed, that is, the reauthentication operation is performed.

In an embodiment of the disclosure, because the same AMF and the same PLMN are used and the AKA is performed via another access (i.e., the 3GPP access) to change the master key, i.e., Kseaf, Kamf may be changed. For example, when the same ngKSI is used, the above-described operation may be performed. The same ngKSI indicates the same security key related to the ngKSI. In this case, Kseaf or Kamf obtained through the AKA procedure via the 3GPP access may be used.

As described above, when the master key or the like is changed through the authentication procedure via the 3GPP access, the change in the master key may also be applied to the non-3GPP access. In an embodiment of the disclosure, ngKSI related to the security key, i.e., Kamf or Kseaf, obtained through the above-described authentication procedure via the 3GPP access is sent. For example, ngKSI 3 may be set as the ngKSI and be transmitted from the AMF 2a-111 to the UE 2a-101.

In an embodiment of the disclosure, when a case in which the same ngKSI is used is not known or when the same ngKSI is received, the ngKSI may be treated as an error.

Then, in operations 661 and 663, the UE 2a-101 sends a security mode complete message to the AMF 2a-111.

Key derivation and ngKSI usage will now be described.

Initially, when AKA occurs via a non-3GPP access and a 3GPP access, separate non-access stratum (NAS) counts are used for the non-3GPP access and the 3GPP access to derive a NAS integrity key and a NAS encryption key.

In an embodiment of the disclosure, because the same ngKSI is used, the same Kamf is indicated by the ngKSI. However, when Kseaf is changed and Kamf is changed due to primary authentication, Kn3iwf derived from Kamf and Kgnb derived from Kamf may be changed due to the change in Kamf.

In an embodiment of the disclosure, a NAS algorithm, an algorithm Id, and an uplink NAS count per access may serve as input values of Knasenc and Knasint. That is, a non-3GPP uplink NAS count may be input for the non-3GPP access and a 3GPP uplink NAS count may be input for the 3GPP access.

In an embodiment of the disclosure, an access type distinguisher may be included to derive Knasenc and Knasint. For example, a distinguisher value of 0x01 may be included for the 3GPP access and a distinguisher value of 0x02 may be included for the non-3GPP access.

In an embodiment of the disclosure, Kseaf may be changed and Kamf may be derived differently for the 3GPP access and the non-3GPP access.

A security mode command (SMC) message will now be described.

In an embodiment of the disclosure, when a SMC message is transmitted from an AMF to a UE, it may be transmitted together with access type information to refer to a parameter related to security.

The access type information may be used to identify whether an access type corresponds to a 3GPP access or a non-3GPP access. In an embodiment of the disclosure, 1 bit may be used as an on/off switch to identify whether the access type corresponds to a 3GPP access or a non-3GPP access. In another embodiment of the disclosure, 2 bits may be used to express a distinguisher value (e.g., 0x01 or 0x02) for identifying whether the access type corresponds to a 3GPP access or a non-3GPP access. For example, a distinguisher value for the 3GPP access may be 0x01, and a distinguisher value for the non-3GPP access may be 0x02.

In an embodiment of the disclosure, the content of the SMC message is as shown below.

TABLE 1

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Security mode command message identity | Message type | M | V | 1 |
| | Selected NAS security algorithms | NAS security algorithms | M | V | 1 |
| | NAS key set identifier | NAS key set identifier | M | V | 1 |
| | Replayed UE security capabilities | UE security capability | M | LV | 3-5 |
| E- | IMEISV request | IMEISV request | O | TV | 1 |
| 55 | Replayed nonce$_{US}$ | Nonce | O | TV | 5 |
| 56 | Nonce$_{AMF}$ | Nonce | O | TV | 5 |
| 4F | Hash$_{AMF}$ | Hash$_{AMF}$ | O | TV | 9 |
| 76 | Selected EPS NAS security algorithms | EPS NAS security algorithms | O | TV | 3 |
| 78 | EAP message | EAP message | O | TLV-E | 7 |
| | Access type | Access type | 0 | TLV | 1 |

In an embodiment of the disclosure, an access type of Table 1 may be configured as shown in Table 2 and be coded as shown in Table 3.

TABLE 2

Access type information element

| 8  7  6  5 | 4  3 | 2  1 | |
|---|---|---|---|
| Access type IEI | 0 scare | Access type | octet 1 |

TABLE 3

Access type information element

Access type value (octet 1, bit 1 to bit 2)
Bits

| 2 | 1 | |
|---|---|---|
| 0 | 1 | 3GPP access |
| 1 | 0 | Non-3GPP access |

All other values are reserved.

The access type of Table 1 may be configured as shown in Table 4 and be coded as shown in Table 5 or Table 6.

In an embodiment of the disclosure, the access type of Table 1 may be configured as shown in Table 4 and be coded as shown in Table 5-a or Table 5-b.

TABLE 4

Access type information element

| 8  7  6  5 | 4  3 | 2  1 | |
|---|---|---|---|
| Access type IEI | 0 spare | Access type | octet 1 |

TABLE 5-a

Access type information element

Access type value (octet 1, bit 1 to bit 2)
Bits

| 1 | |
|---|---|
| 0 | 3GPP access |
| 1 | Non-3GPP access |

All other values are reserved.

TABLE 5-b

Access type information element

Access type value (octet 1, bit 1 to bit 2)
Bits

| | |
|---|---|
| 1 | |
| 0 | Non 3GPP access |
| 1 | 3GPP access |

All other values are reserved.

In an embodiment of the disclosure, ngKSI of Table 1 may be configured as shown below.

TABLE 6

NAS key set identifier information element

| 8  7  6  5 | 4 | 3  2  1 | |
|---|---|---|---|
| NAS key set identifier IEI | TSC | NAS key set identifier | octet 1 |

TABLE 7

NAS key set identifier information element

Type of security context flag (TSC) (octet 1)
Bit

| 4 | |
|---|---|
| 0 | native security context (for KSI$_{AMF}$) |
| 1 | mapped security context (for KSI$_{ASME}$) |

TSC does not apply for NAS key set identifier value "111".
NAS key set identifier (octet 1)
Bits

| 3 | 2 | 1 | |
|---|---|---|---|
| 0 | 0 | 0 | |
| | | | through possible values for the NAS key set identifier |
| 1 | 1 | 0 | |
| 1 | 1 | 1 | no key is available (UE to network); reserved (network to UE) |

In an embodiment of the disclosure, the content of the SMC message is as shown below.

TABLE 8

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Security mode command message identity | Message type | M | V | 1 |
| | Selected NAS security algorithms | NAS security algorithms | M | V | 1 |
| | NAS key set identifier | NAS key set identifier | M | V | 2 |
| | Replayed UE security capabilities | UE security capability | M | LV | 3-5 |
| E- | IMEISV request | IMEISV request | O | TV | 1 |
| 55 | Replayed nonce$_{UE}$ | Nonce | O | TV | 5 |
| 56 | Nonce$_{AMF}$ | Nonce | O | TV | 5 |
| 4F | Hash$_{AMF}$ | Hash$_{AMF}$ | O | TV | 9 |
| 76 | Selected EPS NAS security algorithms | EPS NAS security algorithms | O | TV | 3 |
| 78 | EAP message | EAP message | O | TLV-E | 7 |

According to another embodiment of the disclosure, the access type information may be sent together with NAS key set identifier information of Table 8. The NAS key set identifier information may be configured as shown in Table 9 and be coded as shown in Table 10-a or Table 10-b.

TABLE 9

NAS key set identifier information element

| 8 7 6 5 | 4 | 3 2 1 | |
|---|---|---|---|
| NAS key set identifier IEI | TSC | NAS key set identifier | Octet 1 |
| | | Access type | Octet 2 |

TABLE 10-a

NAS key set identifier information element

Type of security context flag (TSC) (octet 1)
Bit 4
0  native security context (for KSI$_{AMF}$)
1  mapped security context (for KSI$_{ASME}$)
TSC does not apply for NAS key set identifier value "111".
NAS key set identifier (octet 1)
Bits 3 2 1
0 0 0
through possible values for the NAS key set identifier
1 1 0
1 1 1  no key is available (UE to network);
reserved (network to UE)
Access type (octet 2)
Bit 1
0  Non 3GPP access
1  3GPP access TABLE 10-b NAS key set identifier information element Type of security context flag (TSC) (octet 1)
Bit 4
0  native security context (for KSI$_{AMF}$)
1  mapped security context (for KSI$_{ASME}$)
TSC does not apply for NAS key set identifier value "111".
NAS key set identifier (octet 1)
Bits 3 2 1
0 0 0
through possible values for the NAS key set identifier
1 1 0
1 1 1  no key is available (UE to network);
reserved (network to UE)
Access type (octet 2)
Bit 1
0  3GPP access
1  Non 3GPP access According to another embodiment of the disclosure, the access type information may be sent together with the NAS key set identifier information of Table 8. The NAS key set identifier information may be configured as shown in Table 11 and be coded as shown in Table 12.

TABLE 11

NAS key set identifier information element

| 8 7 6 5 | 4 | 3 2 1 | |
|---|---|---|---|
| NAS key set identifier IEI | TSC | NAS key set identifier | octet 1 |
| | | Access type | Octet 2 |

TABLE 12

NAS key set identifier information element

Type of security context flag (TSC) (octet 1)
Bit
4
0  native security context (for KSI$_{AMF}$)
1  mapped security context (for KSI$_{ASME}$)
TSC does not apply for NAS key set identifier value "111".
NAS key set identifier (octet 1)

TABLE 12-continued

NAS key set identifier information element

```
Bits
3    2    1
0    0    0
through          possible values for the NAS key set identifier
1    1    0
1    1    1    no key is available (UE to network);
                reserved (network to UE)
Access type      (octet 2)
Bit
2    1
0    1          3GPP access
1    0          Non 3GPP access
```

In an embodiment of the disclosure, the content of the SMC message is as shown below.

TABLE 13

| IEI | Information Element | Type/Reference | Presence | Format | Length |
|---|---|---|---|---|---|
|  | Extended protocol discriminator | Extended protocol discriminator | M | V | 1 |
|  | Security header type | Security header type | M | V | 1/2 |
|  | Spare half octet | Spare half octet | M | V | 1/2 |
|  | Security mode command message identity | Message type | M | V | 1 |
|  | Selected NAS security algorithms | NAS security algorithms | M | V | 1 |
|  | NAS key set identifier | NAS key set identifier | M | V | 1 |
|  | Replayed UE security capabilities | UE security capability | M | LV | 3-5 |
| E- | IMEISV request | IMEISV request | O | TV | 1 |
| 55 | Replayed nonce$_{UE}$ | Nonce | O | TV | 5 |
| 56 | Nonce$_{AMF}$ | Nonce | O | TV | 5 |
| 4F | Hash$_{AMF}$ | Hash$_{AMF}$ | O | TV | 9 |
| 76 | Selected EPS NAS security algorithms | EPS NAS security algorithms | O | TV | 3 |
| 78 | EAP message | EAP message | O | TLV-E | 7 |
|  | NAS connection identifier | NAS key set identifier | O | TLV | 1 |

A NAS connection identifier in Table 13 may be configured as shown in Table 14 and be coded as shown in Table 15.

TABLE 14

NAS connection identifier information element

```
8    7    6    5         4    3    2    1
NAS connection identifier    NAS connection identifier    octet 1
      IEI
```

TABLE 15

NAS connection identifier information element

```
NAS connection identifier value (octet 1, bit 1 to bit 4)
  |Bits
4    3    2    1
0    0    0    0
  through          possible values for the NAS connection identifier
1    1    1    0
1    1    1    1    no key is available (UE to network);
                    reserved (network to UE)
```

The NAS connection identifier in Table 13 may be configured as shown in Table 16 and be coded as shown in Table 17.

TABLE 16

NAS connection identifier information element

```
8    7    6    5         4         3    2    1
NAS connection identifier IEI    TA    NAS connection    octet 1
                                       identifier
```

TABLE 17

NAS connection idenfier IE

```
Type of Access(TA) (octet 1)
Bit
4
0          3GPP access
1          Non 3GPP accss
TA does not apply for NAS connection identifier value "111".
NAS connection identifier (octet 1)
Bits
3    2    1
0    0    0
through         possible values for the NAS connection identifier
1    1    0
1    1    1    no key is available (UE to network);
                reserved (network to UE)
```

A security mode complete message will now be described.

In an embodiment of the disclosure, when a security mode complete message is transmitted from an AMF to a UE, it may be transmitted together with access type information to refer to a parameter related to security.

The access type information may be used to identify whether an access type corresponds to a 3GPP access or a non-3GPP access. In an embodiment of the disclosure, 1 bit may be used as an on/off switch to identify whether the access type corresponds to a 3GPP access or a non-3GPP access. In another embodiment of the disclosure, 2 bits may be used to express a distinguisher value (e.g., 0x01 or 0x02) for identifying whether the access type corresponds to a 3GPP access or a non-3GPP access. For example, a distinguisher value for the 3GPP access may be 0x01, and a distinguisher value for the non-3GPP access may be 0x02.

In an embodiment of the disclosure, the content of the security mode complete message is as shown below.

TABLE 18

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | Security mode complete message identity | Message type | M | V | 1 |
| 2C | IMEISV | 5G mobile identity | O | TLV | TBD |
| 7D | NAS message container Access type | NAS message container Access type | O | TLV-E | 3-n |

An access type may be configured and coded as shown above in the previous embodiments of the disclosure.

In an embodiment of the disclosure, the content of the security mode complete message is as shown below.

TABLE 19

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | Security mode complete message identity | Message type | M | V | 1 |
| 2C | WEISV | 5G mobile identity | O | TLV | TBD |
| 7D | NAS message container NAS connection identifier | NAS message container NAS connection identifier | O | TLV-E | 3-n |

A NAS connection identifier may be configured and coded as shown above in the previous embodiments of the disclosure.

A SMC message will now be described in association with a NAS security change triggering indication.

The content of the SMC message used in FIGS. 2 and 5 is as shown below.

TABLE 20

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | Security mode command message identity | Message type | M | V | 1 |
| | Selected NAS security algorithms | NAS security algorithms | M | V | 1 |
| | NAS key set identifier | NAS key set identifier | M | V | 1 |
| | Replayed UE security capabilities | UE security capability | M | LV | 3-5 |
| E- | IMEISV request | IMEISV request | O | TV | 1 |
| 55 | Replayed nonce$_{UE}$ | Nonce | O | TV | 5 |
| 56 | Noncem$_{AMF}$ | Nonce | O | TV | 5 |
| 4F | Hash$_{AMF}$ | Hash$_{AMF}$ | O | TV | 9 |
| 76 | Selected EPS NAS security algorithms | EPS NAS security algorithms | O | TV | 3 |

TABLE 20-continued

| IEI | Information Element | Type/Reference | Presence | Format | Length |
|---|---|---|---|---|---|
| 78 | EAP message | EAP message | O | TLV-E | 7 |
|  | Triggering NAS security change indication | Triggering NAS security change | O | TLV | 1 |

A triggering NAS security change indication in Table 20 may be configured as shown in Table 21 and be coded as shown in Table 22 or Table 23.

TABLE 21

| Triggering NAS security change indication information element | | | |
|---|---|---|---|
| 8 7 6 5<br>Triggering NAS security change indication IEI | 4 3<br>0<br>spare | 2 1<br>Triggering NAS security change indication | octet 1 |

In FIG. 2, an indication of whether to trigger SMC not only for a current access, via which authentication is performed, but also for an access other than the current access is given as shown in Table 22.

TABLE 22

| Triggering NAS security change indication information element |
|---|
| Triggering NAS security change indication value (octet 1, bit 1 to bit 2)<br>Bits<br>1 |

TABLE 22-continued

| Triggering NAS security change indication information element |
|---|
| 0      Not trigger for other access<br>1      Trigger for other access<br>All other values are reserved. |

In FIG. 5, when there is an access that has performed authentication, SMC is performed to change current security context of another access and a reason why SMC is performed may be given to the current access.

TABLE 23

| Triggering NAS security change indication information element |
|---|
| Access type value (octet 1, bit 1 to bit 2)<br>Bits<br>1<br>0      Not trigger<br>1      Trigger<br>All other values are reserved. |

A security mode complete message will now be described.

In FIG. 3, a security mode complete message shown below is referred.

TABLE 24

| IEI | Information Element | Type/Reference | Presence | Format | Length |
|---|---|---|---|---|---|
|  | Extended protocol discriminator | Extended protocol discriminator | M | V | 1 |
|  | Security header type | Security header type | M | V | 1/2 |
|  | Spare half octet | Spare half octet | M | V | 1/2 |
|  | Security mode complete message identity | Message type | M | V | 1 |
| 2C | IMEISV | 5G mobile identity | O | TLV | TBD |
| 7D | NAS message container | NAS message container | O | TLV-E | 3-n |
|  | Triggering NAS security change | Triggering NAS security change |  |  |  |

A triggering NAS security change indication may be configured as shown in Table 25 and be coded as shown in Table 26.

TABLE 25

Triggering NAS security change indication information element

| 8 7 6 5 | 4 3 | 2 1 | |
|---|---|---|---|
| Triggering NAS security change indication IEI | 0 spare | Triggering NAS security change indication | octet 1 |

The triggering NAS security change indication of whether to trigger SMC for an access other than a current access via which authentication is performed is given from a UE to a network entity as shown in Table 25.

TABLE 26

Triggering NAS security change indication information element

Triggering NAS security change indication value (octet 1, bit 1 to bit 2)
Bits
1
0      Not trigger for other access
1      Trigger for other access
All other values are reserved.

An authentication response message will now be described.

TABLE 27

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | Authentication response message identity | Message type | M | V | 1 |
| 2D | Authentication response parameter | Authentication response parameter | O | TLV | 6-18 |
| 78 | EAP message | EAP message | O | TLV-E | 7-1503 |
| | Triggering NAS security change | Triggering NAS security change | | | |

A triggering NAS security change indication in Table 27 may be configured as shown in Table 28 and be coded as shown in Table 29.

TABLE 28

Triggering NAS security change indication information element

| 8 7 6 5 | 4 3 | 2 1 | |
|---|---|---|---|
| Triggering NAS security change indication IEI | 0 spare | Triggering NAS security change indication | octet 1 |

The triggering NAS security change indication of whether to trigger SMC not only for a current access, via which authentication is performed, but also for an access other than the current access is given from a UE to a network entity as shown in Table 28.

TABLE 29

Triggering NAS security change indication information element

Triggering NAS security change indication value (octet 1, bit 1 to bit 2)
Bits
1
0    Not trigger for other access
1    Trigger for other access
All other values are reserved.

An authentication request message will now be described.

TABLE 30

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | Authentication request message identity | Message type | M | V | 1 |
| | ngKSI | NAS key set identifier | M | V | 1/2 |
| | Spare half octet | Spare half octet | M | V | 1/2 |
| 21 | Authentication parameter RAND (5G authentication challenge) | Authentication parameter RAND | O | TV | 17 |
| 20 | Authentication parameter AUTN (5G authentication challenge) | Authentication parameter AUTN | O | TLV | 18 |
| 78 | EAP message | EAP message | O | TLV-E | 7-1503 |
| | Triggering NAS security change | Triggering NAS security change | | | |

A triggering NAS security change indication in Table 30 may be configured as shown in Table 31 and be coded as shown in Table 32.

TABLE 31

Triggering NAS security change indication information element

| 8 7 6 5 | 4 3 | 2 1 | |
|---|---|---|---|
| Triggering NAS security change indication IEI | 0 spare | Triggering NAS security change indication | octet 1 |

The triggering NAS security change indication of whether to trigger SMC not only for a current access, via which authentication is performed, but also for an access other than the current access is given as shown in Table 31.

TABLE 32

Triggering NAS security change indication information element

Triggering NAS security change indication value (octet 1, bit 1 to bit 2)
Bits
1
0    Not trigger for other access
1    Trigger for other access
All other values are reserved.

A key derivation method according to an embodiment of the disclosure will now be described.

In an embodiment of the disclosure, when keys are derived, a NAS counter may be used. Herein, the NAS counter may include at least one of four counters described below.

A 3GPP uplink NAS counter for a 3GPP access
    A 3GPP downlink NAS counter for a 3GPP access
    A non-3GPP uplink NAS counter for a non-3GPP access
    A non-3GPP downlink NAS counter for a non-3GPP access The 3GPP uplink NAS counter may be used to derive 3GPP Knasint and 3GPP Knasenc for NAS message protection. In an embodiment of the disclosure, 3GPP Knasint and 3GPP Knasenc may be a NAS integrity protection key and a NAS encryption protection key, respectively. 1) An input key of 3GPP Knasint and 3GPP Knasenc may be Kamf, and 2) a string included in a key derivation function may be configured as shown below.

FC=0x69 or value to be determined by standard
    P0=algorithm type distinguisher
        N-NAS-enc-alg 0x01
        N-NAS-int-alg 0x02
    L0=length of algorithm type distinguisher (i.e. 0x00 0x01)
    P1=algorithm identity
    L1=length of algorithm identity (i.e. 0x00 0x01)
    P2=3GPP Uplink NAS COUNT
    L2=length of 3GPP uplink NAS COUNT (i.e. 0x00 0x04)

In the afore-described embodiment of the disclosure, because a 3GPP uplink NAS count is used, an access type distinguisher may not be used for an input string.

The non-3GPP uplink NAS counter is used to derive non-3GPP Knasint and non-3GPP Knasenc for non-3GPP NAS message protection. Non-3GPP Knasint and non-3GPP Knasenc may be a NAS integrity protection key and a NAS encryption protection key, respectively. 1) An input key of non-3GPP Knasint and non-3GPP Knasenc may be Kamf, and 2) a string included in a key derivation function may be configured as shown below.

FC=0x69 or FC=0x?? to be determined by standard
    P0=algorithm type distinguisher
        N-NAS-enc-alg 0x01
        N-NAS-int-alg 0x02
    L0=length of algorithm type distinguisher (i.e. 0x00 0x01)
    P1=algorithm identity
    L1=length of algorithm identity (i.e. 0x00 0x01)
    P2=non-3GPP Uplink NAS COUNT
    L2=length of non-3GPP uplink NAS COUNT (i.e. 0x00 0x04)

In the afore-described embodiment of the disclosure, because a non-3GPP uplink NAS count is used, an access type distinguisher may not be used for an input string.

An uplink NAS counter is used to derive Knasint and Knasenc for NAS message protection. Knasint and Knasenc may be a NAS integrity protection key and a NAS encryption protection key, respectively. In an embodiment of the disclosure, in addition to the uplink NAS counter, an access type distinguisher may be used as an input string. 1) An input key of Knasint and Knasenc may be Kamf, and 2) a string included in a key derivation function may be configured as shown below.

FC=0x69 or value to be determined by standard
    P0=algorithm type distinguisher
        N-NAS-enc-alg 0x01
        N-NAS-int-alg 0x02
    L0=length of algorithm type distinguisher (i.e. 0x00 0x01)
    P1=algorithm identity
    L1=length of algorithm identity (i.e. 0x00 0x01)
    P2=Uplink NAS COUNT
    L2=length of uplink NAS COUNT (i.e. 0x00 0x04)
    P3=Access type distinguisher Herein, 0x01 may be used for a 3GPP access, and 0x02 may be used for a non-3GPP access.

L3=length of Access type distinguisher (i.e. 0x00 0x01)

In the afore-described embodiment of the disclosure, P3 and L3 are included in the input string as a distinguisher, i.e., an access type distinguisher. In an embodiment of the disclosure, P2 and L2 may use an uplink NAS count. P2 and L2 may use a 3GPP uplink NAS count for a 3GPP access. P2 and L2 may use a non-3GPP uplink NAS count for a non-3GPP access.

A key derivation method according to another embodiment of the disclosure will now be described.

In an embodiment of the disclosure, when keys are generated, a NAS counter may be used. Herein, when the NAS counter is used for both of a 3GPP access and a non-3GPP access, two types of counters and access type information may be used.

Uplink NAS counter+access type information (3GPP or non-3GPP)
    Downlink NAS counter+access type information (3GPP or non-3GPP)

In an embodiment of the disclosure, an NAS access may include a unique NAS connection identifier. In an embodiment of the disclosure, the NAS connection identifier may include a pair of an uplink NAS counter and a downlink NAS counter for a 3GPP access, and may include a pair of an uplink NAS counter and a downlink NAS counter for a non-3GPP access.

In this case, by transmitting the NAS connection identifier in a SMC message and a security mode complete message, the NAS connection identifier may be used in the SMC message and the security mode complete message to reset a NAS count value or to perform verification for integrity protection.

In this case, a NAS encryption key may equal a NAS integrity key.

In an embodiment of the disclosure, an uplink NAS counter may be used to derive Knasint and Knasenc for NAS message protection. Knasint and Knasenc may be a NAS integrity protection key and a NAS encryption protection key, respectively.

In another embodiment of the disclosure, in addition to the uplink NAS counter, a NAS connection identifier may be used. In this case, the NAS connection identifier may be used to determine whether to refer to a security context related to a 3GPP access or a security context related to a non-3GPP access. At this time, when Kamf is derived, a NAS counter is shared for a 3GPP access and a non-3GPP access and thus a NAS counter value may not be reset.

In an embodiment of the disclosure, 1) an input key of Knasint and Knasenc may be Kamf, and 2) a string included in a key derivation function may be configured as shown below.

FC=0x69 or value to be determined by standard
    P0=algorithm type distinguisher
        N-NAS-enc-alg 0x01
        N-NAS-int-alg 0x02
    L0=length of algorithm type distinguisher (i.e. 0x00 0x01)
    P1=algorithm identity
    L1=length of algorithm identity (i.e. 0x00 0x01)
    P2=Uplink NAS COUNT
    L2=length of uplink NAS COUNT (i.e. 0x00 0x04)
    P3=NAS connection identifier
    L3=length of NAS connection identifier (i.e. 0x00 0x01)

In the afore-described embodiment of the disclosure, P3 and L3 are included in the input string as a distinguisher, i.e., a NAS connection identifier, and thus P2 and L2 may use an uplink NAS count.

According to an embodiment of the disclosure, in a mobile communication system, information transmitted from a UE to a network entity may be protected. Specifically, when information is transmitted between a UE and a network entity, security of communication may be enhanced by efficiently performing procedures related to creation, storage, updating, and management of security context used for security protection.

Figure 7:
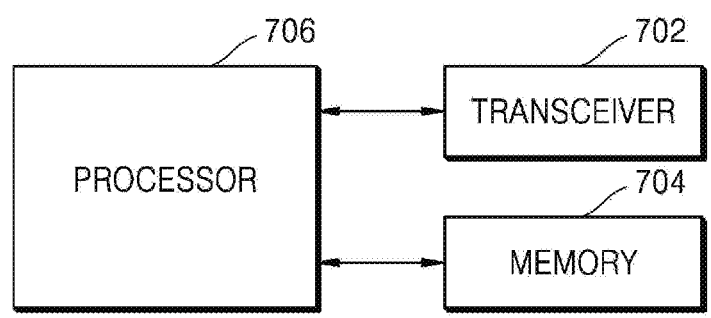
FIG. 7 is a block diagram of a user equipment (UE) according to an embodiment of the disclosure.

FIG. 7 is a block diagram of a UE according to an embodiment of the disclosure.

Referring to FIG. 7, the UE may include a transceiver 702, a memory 704, and a processor 706. According to the above-described communication method of the UE, the transceiver 702, the memory 704, and the processor 706 of the UE may operate. However, elements of the UE are not limited to the above-mentioned examples. For example, the UE may include a larger or smaller number of elements compared to the above-mentioned elements. In addition, the transceiver 702, the memory 704, and the processor 706 may be configured as a single chip.

The transceiver 702 may transmit and receive signals to and from a base station. Herein, the signals may include control information and data. To this end, the transceiver 702 may include, for example, a radio frequency (RF) transmitter for up-converting a frequency of and amplifying a signal to be transmitted, and a RF receiver for low-noise-amplifying and down-converting a frequency of a received signal. However, the above-mentioned elements are merely examples and elements of the transceiver 702 are not limited to the RF transmitter and the RF receiver.

The transceiver 702 may receive a signal through a wireless channel and provide the signal to the processor 706, and may transmit a signal output from the processor 706, through the wireless channel.

The memory 704 may store programs and data required for operation of the UE. The memory 704 may also store control information or data included in signals obtained by the UE. The memory 704 may include any or a combination of storage media such as read-only memory (ROM), random access memory (RAM), a hard disk, a compact disc (CD)-ROM, and a digital versatile disc (DVD). The memory 704 may include a plurality of memories. In an embodiment of the disclosure, the memory 704 may store a program for supporting beam-based cooperative communication.

The processor 706 may control a series of procedures to operate the UE according to the afore-described embodiments of the disclosure. The processor 706 may control only some procedures according to the afore-described embodiments of the disclosure. However, the processor 706 is not limited thereto and may control all procedures to operate the UE according to all or some of the afore-described embodiments of the disclosure.

Figure 8:
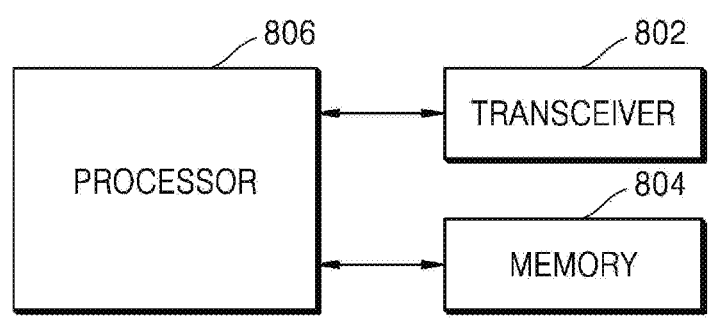
FIG. 8 is a block diagram of a network entity according to an embodiment of the disclosure.

FIG. 8 is a block diagram of a network entity according to an embodiment of the disclosure.

Referring to FIG. 8, the network entity may include a transceiver 802, a memory 804, and a processor 806. According to the above-described communication method of the network entity, the transceiver 802, the memory 804, and the processor 806 of the network entity may operate. However, elements of the network entity are not limited to the above-mentioned examples. For example, the network entity may include a larger or smaller number of elements compared to the above-mentioned elements. In addition, the transceiver 802, the memory 804, and the processor 806 may be configured as a single chip. In an embodiment of the disclosure, the network entity may include a base station or an entity included in a core network, e.g., an AMF or a SMF.

The transceiver 802 may transmit and receive signals to and from a UE. Herein, the signals may include control information and data. To this end, the transceiver 802 may include, for example, a radio frequency (RF) transmitter for up-converting a frequency of and amplifying a signal to be transmitted, and a RF receiver for low-noise-amplifying and down-converting a frequency of a received signal. However, the above-mentioned elements are merely examples and elements of the transceiver 802 are not limited to the RF transmitter and the RF receiver.

The transceiver 802 may receive a signal through a wireless channel and provide the signal to the processor 806, and may transmit a signal output from the processor 806, through the wireless channel.

The memory 804 may store programs and data required for operation of the network entity. The memory 804 may also store control information or data included in signals obtained by the network entity. The memory 804 may include any or a combination of storage media such as ROM, RAM, a hard disk, a CD-ROM, and a DVD. The memory 804 may include a plurality of memories. In an embodiment of the disclosure, the memory 804 may store a program for supporting beam-based cooperative communication.

The processor 806 may control a series of procedures to operate the network entity according to the afore-described embodiments of the disclosure. The processor 806 may control only some procedures according to the afore-described embodiments of the disclosure. However, the processor 806 is not limited thereto and may control all procedures to operate the network entity according to all or some of the afore-described embodiments of the disclosure.

According to the embodiments of the disclosure, a mobile communication system may effectively provide services.

The methods according to the embodiments of the disclosure as described herein or in the following claims may be implemented as hardware, software, or a combination of hardware and software.

When implemented as software, a computer-readable storage medium or computer program product storing one or more programs (e.g., software modules) may be provided. The one or more programs stored in the computer-readable storage medium or computer program product may be configured for execution by one or more processors in an electronic device. The one or more programs may include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette tape. Alternatively, the programs may be stored in memory including a combination of some or all of the above-mentioned storage media. A plurality of such memories may be included.

In addition, the programs may be stored in an attachable storage device accessible through any or a combination of communication networks such as the internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description and the disclosure is not limited to the singular or plural form. An element expressed in a singular form may include a plurality of elements, and elements expressed in a plural form may include a single element.

It should be understood that embodiments of the disclosure described herein should be considered in a descriptive sense only and not for purposes of limitation. That is, it will be understood by one of ordinary skill in the art that various changes in form and details may be made in the embodiments of the disclosure without departing from the scope as defined by the following claims. The embodiments of the disclosure may be combined as necessary. For example, a part of an embodiment of the disclosure may be combined with a part of another embodiment of the disclosure. The embodiments of the disclosure may be applied to other systems, e.g., a Long-Term Evolution (LTE) system and a 5G or NR system, through modification without departing from the scope as defined by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing a security mode control procedure by a user equipment (UE), the method comprising:
    registering to an access and mobility management function (AMF) and a public land mobile network (PLMN) over a 3rd generation partnership project (3GPP) access;
    registering to the AMF and the PLMN over a non-3GPP access;
    performing, over the 3GPP access, a first authentication procedure and a first key agreement procedure with the AMF, wherein a key set identifier (ngKSI) is changed from a first ngKSI to a second ngKSI during the first authentication procedure and the first key agreement procedure, the second ngKSI corresponds to new security context; and
    in response to performing the first authentication procedure and the first key agreement procedure with the AMF over the 3GPP access:
        receiving, from the AMF over the 3GPP access, a first security mode command message including the second ngKSI, and
        receiving, from the AMF over a non-3GPP access, a second security mode command message including the second ngKSI.

2. The method of claim 1, wherein the second ngKSI corresponds to the new security context changed based on the first authentication procedure and the first key agreement procedure.

3. The method of claim 1, further comprising:
    transmitting, to the AMF, a first security mode complete message in response to the first security mode command message; and
    transmitting, to the AMF, a second security mode complete message in response to the second security mode command message.

4. The method of claim 1, further comprising:
    performing, over the non-3GPP access, a second authentication procedure and a second key agreement procedure with the AMF, wherein the second ngKSI is changed to a third ngKSI during the second authentication procedure and the second key agreement procedure; and
    in response to performing the second authentication procedure and the second key agreement procedure with the AMF over the non-3GPP access:
        receiving, from the AMF over the non-3GPP access, a third security mode command message including the third ngKSI, and
        receiving, from the AMF over a 3GPP access, a fourth security mode command message including the third ngKSI.

5. The method of claim 4, wherein the third ngKSI corresponds to security context changed based on the second authentication procedure and the second key agreement procedure.

6. A user equipment (UE) comprising:
    a transceiver; and
    at least one controller connected to the transceiver and configured to:
        register to an access and mobility management function (AMF) and a public land mobile network (PLMN) over a 3rd generation partnership project (3GPP) access,
        register to the AMF and the PLMN over a non-3GPP access,
        perform, over the 3GPP access, a first authentication procedure and a first key agreement procedure with the AMF wherein a key set identifier (ngKSI) is changed from a first ngKSI to a second ngKSI during the first authentication procedure and the first key agreement procedure, the second ngKSI corresponds to new security context, and
        in response to performing the first authentication procedure and the first key agreement procedure with the AMF over the 3GPP access:
            receive, from the AMF over the 3GPP access, a first security mode command message including the second ngKSI, and
            receive, from the AMF over a non-3GPP access, a second security mode command message including the second ngKSI.

7. The UE of claim 6, wherein the second ngKSI corresponds to the new security context changed based on the first authentication procedure and the first key agreement procedure.

8. The UE of claim 6, wherein the at least one controller is further configured to:
    transmit, to the AMF, a first security mode complete message in response to the first security mode command message, and
    transmit, to the AMF, a second security mode complete message in response to the second security mode command message.

9. The UE of claim 6, wherein the at least one controller is further configured to:
    perform, over a non-3GPP access, a second authentication procedure and a second key agreement procedure with the AMF, wherein the second ngKSI is changed to a third ngKSI during the second authentication procedure and the second key agreement procedure, receive, from the AMF over the non-3GPP access, a third security mode command message including the third ngKSI, and receive, from the AMF over a 3GPP access, a fourth security mode command message including the third ngKSI.

10. The UE of claim 9, wherein the third ngKSI corresponds to security context changed based on the second authentication procedure and the second key agreement procedure.

11. A method of performing a security mode control procedure by an access and mobility management function (AMF), the method comprising:

performing, over a $3^{rd}$ generation partnership project (3GPP) access, a first authentication procedure and a first key agreement procedure with a user equipment (UE), wherein a key set identifier (ngKSI) is changed from a first ngKSI to a second ngKSI during the first authentication procedure and the first key agreement procedure, the second ngKSI corresponds to new security context; and in response to performing the first authentication procedure and the first key agreement procedure with the UE over the 3GPP access:

transmitting, to the UE over the 3GPP access, a first security mode command message including the second ngKSI, and transmitting, to the UE over a non-3GPP access, a second security mode command message including the second ngKSI, wherein the UE is registered to the AMF and a same public land mobile network (PLMN) over both the 3GPP access and the non-3GPP access.

12. The method of claim 11, wherein the second ngKSI corresponds to the new security context changed based on the first authentication procedure and the first key agreement procedure.

13. The method of claim 11, further comprising:

receiving, from the UE, a first security mode complete message in response to the first security mode command message; and receiving, from the UE, a second security mode complete message in response to the second security mode command message.

14. The method of claim 11, further comprising:

performing, over the non-3GPP access, a second authentication procedure and a second key agreement procedure with the UE, wherein the second ngKSI is changed to a third ngKSI during the second authentication procedure and the second key agreement procedure; and in response to performing the second authentication procedure and the second key agreement procedure with the UE over the non-3GPP access:

transmitting, to the UE over the non-3GPP access, a third security mode command message including the third ngKSI, and transmitting, to the UE over a 3GPP access, a fourth security mode command message including the third ngKSI.

15. The method of claim 14, wherein the third ngKSI corresponds to security context changed based on the second authentication procedure and the second key agreement procedure.

16. An access and mobility management function (AMF) comprising:

a transceiver; and at least one controller connected to the transceiver and configured to:

perform, over a $3^{rd}$ generation partnership project (3GPP) access, a first authentication procedure and a first key agreement procedure with a user equipment (UE), wherein a key set identifier (ngKSI) is changed from a first ngKSI to a second ngKSI during the first authentication procedure and the first key agreement procedure, the second ngKSI corresponds to new security context, and in response to performing the first authentication procedure and the first key agreement procedure with the UE over the 3GPP access:

transmit, to the UE over the 3GPP access, a first security mode command message including the second ngKSI, and transmit, to the UE over a non-3GPP access, a second security mode command message including the second ngKSI, wherein the UE is registered to the AMF and a same public land mobile network (PLMN) over both the 3GPP access and the non-3GPP access.

17. The AMF of claim 16, wherein the second ngKSI corresponds to the new security context changed based on the first authentication procedure and the first key agreement procedure.

18. The AMF of claim 16, wherein the at least one controller is further configured to:

receive, from the UE, a first security mode complete message in response to the first security mode command message, and receive, from the UE, a second security mode complete message in response to the second security mode command message.

19. The AMF of claim 16, wherein the at least one controller is further configured to:

perform, over the non-3GPP access, a second authentication procedure and a second key agreement procedure with the UE, wherein the second ngKSI is changed to a third ngKSI during the second authentication procedure and the second key agreement procedure, and in response to performing the second authentication procedure and the second key agreement procedure with the UE over the non-3GPP access:

transmit, to the UE over the non-3GPP access, a third security mode command message including the third ngKSI, and transmit, to the UE over a 3GPP access, a fourth security mode command message including the third ngKSI.

20. The AMF of claim 19, wherein the third ngKSI corresponds to security context changed based on the second authentication procedure and the second key agreement procedure.

* * * * *